(12) United States Patent
Wentland et al.

(10) Patent No.: US 8,094,041 B2
(45) Date of Patent: Jan. 10, 2012

(54) SEAT CUSHION RETENTION AND MONITORING IN AN AIRCRAFT

(75) Inventors: Mark E. Wentland, Lynnwood, WA (US); Bret L. Lamoree, Snohomish, WA (US); James P. Sohalla, Edmonds, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 12/059,209

(22) Filed: Mar. 31, 2008

(65) Prior Publication Data

US 2009/0243868 A1    Oct. 1, 2009

(51) Int. Cl.
G08B 21/00    (2006.01)

(52) U.S. Cl. .................. 340/945; 244/117 R

(58) Field of Classification Search .......... 340/945, 340/652, 653; 244/117 R, 122 R
See application file for complete search history.

(56) References Cited

U.S. PATENT DOCUMENTS

| | | | | |
|---|---|---|---|---|
| 1,387,798 | A * | 8/1921 | Miller | 200/85 A |
| 2,419,884 | A * | 4/1947 | Caughey | 297/309 |
| 2,982,075 | A | 5/1961 | Foster | |
| 3,623,683 | A | 11/1971 | Bennett | |
| 3,923,198 | A | 12/1975 | Brochman | |
| 5,082,702 | A | 1/1992 | Alband | |
| 5,745,030 | A * | 4/1998 | Aaron | 340/426.11 |
| 5,810,392 | A * | 9/1998 | Gagnon | 280/735 |
| 5,945,914 | A * | 8/1999 | Holmes et al. | 340/667 |
| 5,990,799 | A * | 11/1999 | Boon et al. | 340/667 |
| 6,054,922 | A * | 4/2000 | Smith | 340/568.1 |
| 6,082,816 | A | 7/2000 | Gottlieb et al. | |
| 6,929,218 | B1 | 8/2005 | Sanford et al. | |
| 6,960,110 | B2 | 11/2005 | Hough | |
| 7,077,466 | B2 | 7/2006 | Forstner et al. | |
| 7,178,867 | B2 | 2/2007 | Hough | |
| 7,252,569 | B2 | 8/2007 | Everhart et al. | |
| 7,530,631 | B2 | 5/2009 | Skelly et al. | |
| 2003/0215162 | A1 | 11/2003 | Switlik et al. | |
| 2004/0239435 | A1 | 12/2004 | Hughes et al. | |
| 2005/0062319 | A1 | 3/2005 | Hough | |
| 2006/0138813 | A1 | 6/2006 | Hough | |
| 2007/0015422 | A1 | 1/2007 | Everhart et al. | |
| 2007/0232164 | A1 | 10/2007 | Swan et al. | |
| 2008/0106127 | A1 | 5/2008 | Hough et al. | |

OTHER PUBLICATIONS

U.S. Appl. No. 12/059,891, filed Mar. 31, 2008, Lamoree et al.
USPTO Office Action dated Jul. 6, 2011 for U.S. Appl. No. 12/059,891 Aug. 2, 2004.

* cited by examiner

Primary Examiner — George Bugg
Assistant Examiner — Edny Labbees
(74) Attorney, Agent, or Firm — Yee & Associates, P.C.

(57) ABSTRACT

An aircraft seating system comprises a seat frame having a top side, a seat cushion having a bottom side, a plurality of conductive first sides of a hook-and-loop fastener system attached to the bottom side of the seat cushion in a first pattern, a plurality of conductive second sides of the hook-and-loop fastener system attached to the top side of the seat frame in a second pattern, and a sensor connector connected to the second pattern. The plurality of conductive first sides and the plurality of conductive second sides engage each other and create a closed circuit for the sensor connector when the bottom side of the seat cushion is placed on the top side of the seat frame.

21 Claims, 10 Drawing Sheets

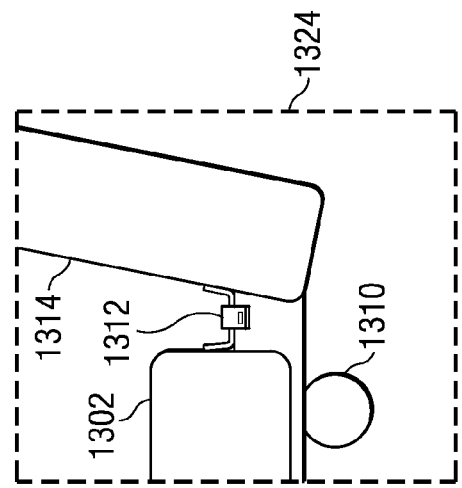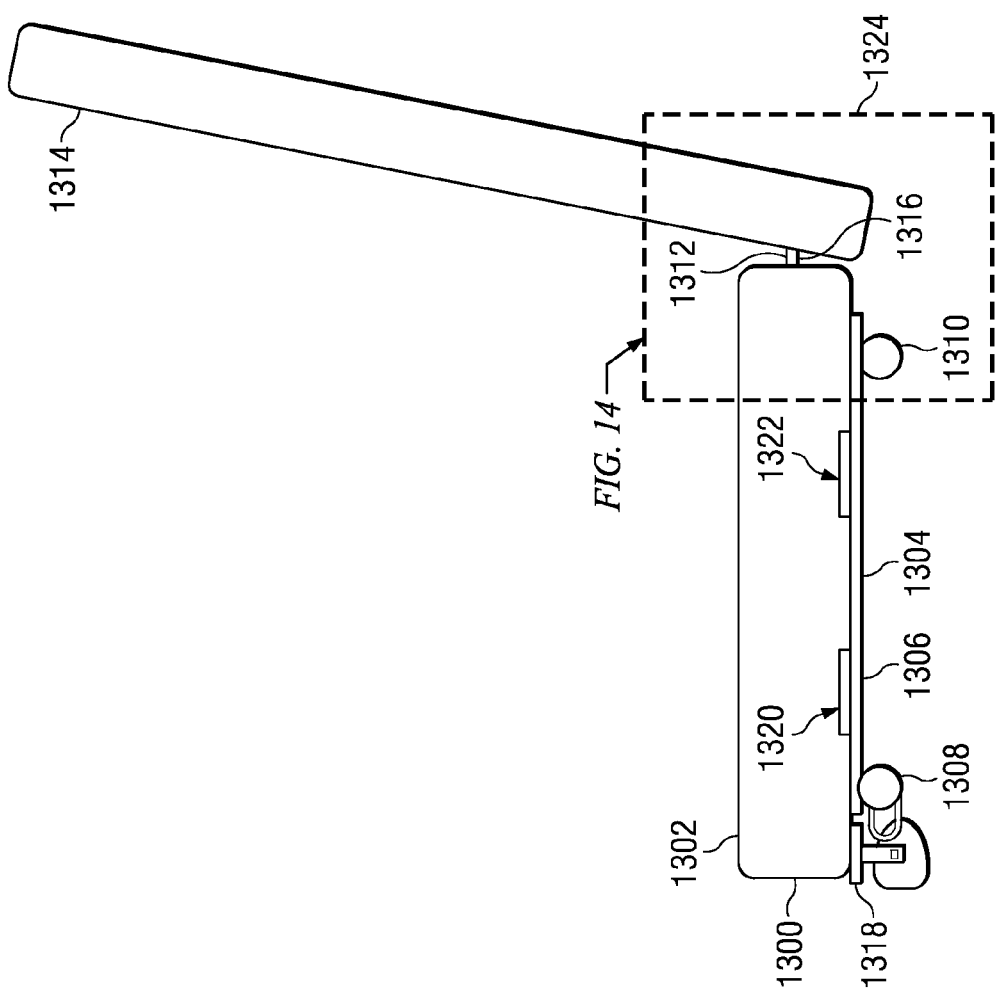

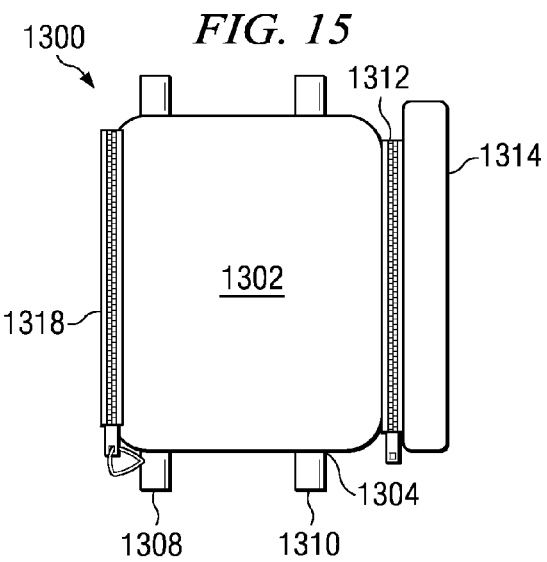
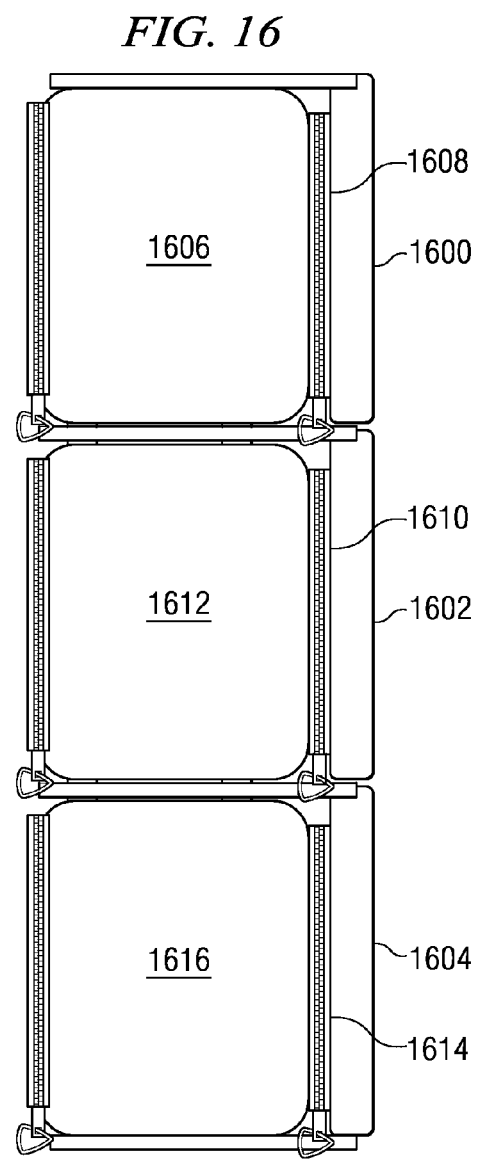
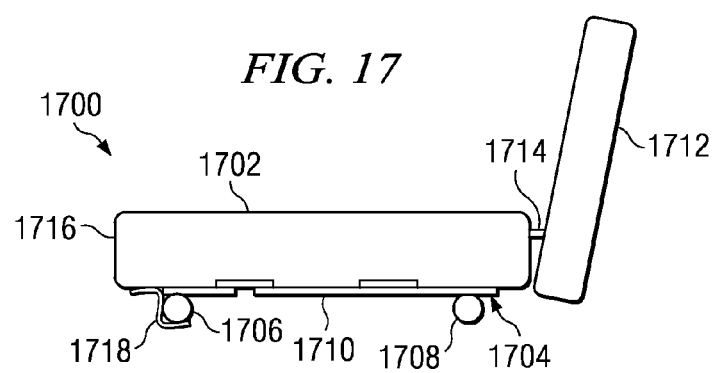

SEAT CUSHION RETENTION AND MONITORING IN AN AIRCRAFT

BACKGROUND INFORMATION

1. Field

The present disclosure relates generally to aircraft and in particular to monitoring and managing activity in an aircraft. Still more particularly, the present disclosure relates to monitoring and retaining seat cushions in an aircraft.

2. Background

Currently, inspections of the interior of an aircraft may be made to prevent placement of or identify prohibited objects and/or items in an aircraft. The current inspections may be performed to ensure the finding of and/or disposing of these types of objects. Aircraft may regularly undergo vigorous inspections each day while cleaning the aircraft between. These actions may require several man hours per aircraft per day. If any areas appear to be tampered with, a more thorough inspection may then be performed.

For example, a passenger aircraft with 136 seats may require several man hours to inspect every seat cushion and other areas of the aircraft. Visual inspections may be performed concurrent with the cleaning of the passenger cabin. These visual inspections may be performed to identify areas in which tampering may have occurred. If any areas appear to be tampered with, a more thorough inspection may then be performed. These types of inspections also may cause unintended wear on parts, resulting in increased maintenance and replacement costs. For example, removing and replacing cushions repeatedly may result in parts being replaced more often.

These and other types of inspections may be time consuming and may increase the amount of time needed between flights. These types of inspections may reduce the number of flights possible, as well as requiring increased personnel to perform inspections.

Attempts have been made to make inspections easier to perform. For example, life vests have been put in boxes or compartments with doors. These doors may then be sealed with a tamper evident device. As a result, a visual inspection may be quickly made to determine whether the tamper evident device is intact.

Visually inspecting the spaces, including seat cushions, may be labor intensive. This type of inspection may increase expense and time to operate flights. Most spaces in an aircraft may not be accessed or tampered with the majority of the time. These types of seat cushions may not be designed for inspections requiring regular removal and reinstallation. As a result, these types of seat cushions may not withstand this type of daily activity. As a result, additional maintenance and replacement may be required causing significant additional costs to airlines.

Therefore, it would be advantageous to have an improved method and apparatus to overcome the problems described above.

SUMMARY

An embodiment of the present disclosure provides a seating system comprises a seat frame having a top side, a seat cushion having a bottom side, a plurality of conductive first sides attached to the bottom side of the seat cushion in a first pattern, a plurality of conductive second sides attached to the top side of the seat frame in a second pattern, and a sensor connector connected to the second pattern. The plurality of conductive first sides and the plurality of conductive second sides engage each other and create a closed circuit for the sensor connector when the bottom side of the seat cushion is placed on the top side of the seat frame.

In yet another advantageous embodiment, a seating system comprises a seat frame having a back, a seat cushion, a first side of a zipper attached to a back end of the seat cushion, a second side of the zipper attached to the back of the seat frame, a securing mechanism attached to a front end of the seat cushion, and a locking mechanism. The locking mechanism is capable of locking the first side and the second side of the zipper in a joined configuration.

In another advantageous embodiment, an aircraft seating system is provided for detecting unauthorized movement of seat cushions in an aircraft. The aircraft seating system comprises a seat frame having a top side, a seat cushion having a bottom side, a plurality of conductive first sides, a plurality of conductive second sides, a first side of a zipper attached to a back end of the seat cushion, a second side of the zipper attached to the back of the seat frame, a securing mechanism attached to a front end of the seat cushion, a locking mechanism capable of locking the first side and the second side of the zipper in a joined configuration, and a sensor connector connected to the second pattern. The plurality of conductive first sides are part of a hook and loop fastener system attached to the bottom side of the seat cushion in a first pattern and is a plurality of strips with hooks. The plurality of conductive second sides are part of a hook and loop fastener system attached to a seat pan on the top side of the seat frame in a second pattern and is a plurality of strips with loops. The plurality of conductive first sides and the plurality of conductive second sides engage each other and create a closed circuit for the sensor connector when the bottom side of the seat cushion is placed on the top side of the seat frame, wherein movement sufficient to disturb the closed circuit generates an indication that an unauthorized movement of the seat cushion has occurred.

In still another advantageous embodiment, a method is present for monitoring a seat cushion for an aircraft seat. A seat cushion having a first plurality of conductive sides arranged in a first pattern on a bottom side of the seat cushion is placed onto a seat frame for the aircraft seat having a second plurality of conductive side arranged in a second pattern to form a closed circuit for a sensor connector. The sensor connector is monitored for a change in the closed circuit to an open circuit. Responsive to detecting the change, an alert is generated.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 13 is an illustration of a side view of a portion of an aircraft seat is depicted in accordance with an advantageous embodiment;

FIG. 14 is a more detailed illustration of a portion of an aircraft seat in accordance with an advantageous embodiment;

FIG. 15 is a top view of an aircraft seat in accordance with an advantageous embodiment;

FIG. 16 is an illustration of three seats using zipper barriers in accordance with an advantageous embodiment;

FIG. 17 is an illustration of a side view of an aircraft seat in accordance with an advantageous embodiment;

DETAILED DESCRIPTION

Figure 1:
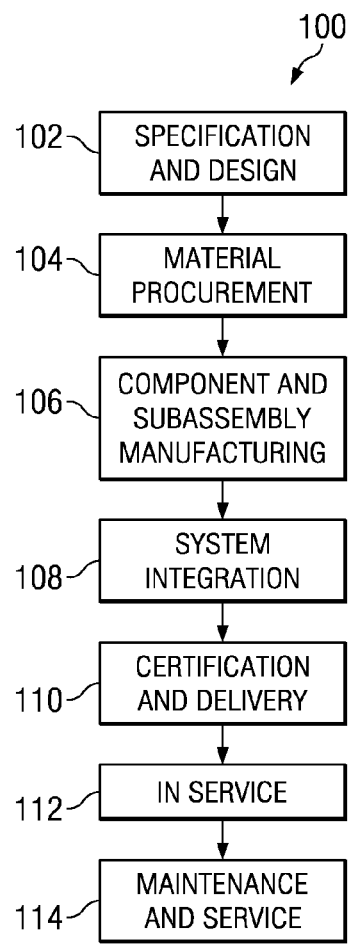
FIG. 1 is an illustration illustrating an aircraft manufacturing and service method in which an advantageous embodiment may be implemented.
Figure 2:
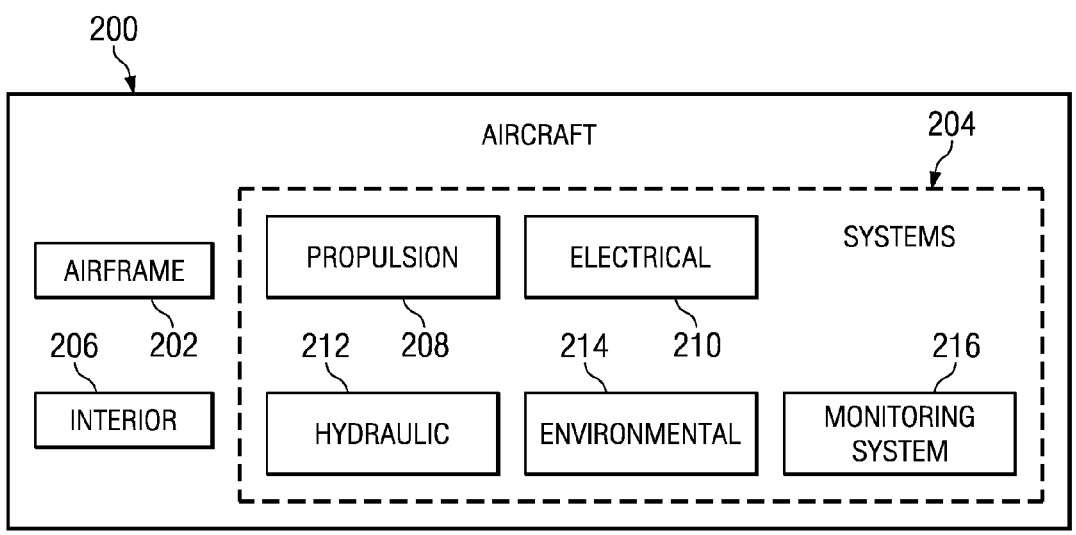
FIG. 2 is an illustration of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include inspections, modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214 and monitoring system 216. Any number of other systems may be included. Although an aerospace example is shown, different advantageous embodiments may be applied to other mobile and/or fixed based industries, such as, without limitation, the automotive industry and stadium/theatrical/group seating respectively.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing initial and/or operating cost of aircraft 200. Similarly, one or more of apparatus embodiments, method embodiments, or a combination thereof may be utilized while aircraft 200 is in service 112 or during maintenance and service 114 in FIG. 1.

As a specific example, advantageous embodiments may be for example, without limitation, implemented in aircraft seats during various stages, such as component and subassembly manufacturing 106 and system interrogation 108. Further, modifications or changes to existing aircraft seats may be made to include advantageous embodiments during maintenance and service 114.

The different advantageous embodiments recognize that the currently used processes for inspecting a passenger cabin may be time consuming and costly. The different advantageous embodiments recognize that certain portions of the passenger cabin may not practically be monitored, tamper evident tapes, or similar suitable tapes or seals. For example, without limitation, a tamper evident tape may be placed over an object, such as, for example, a door, a grill, a lid, or some other suitable object. Opening of the object may break the tamper evident tape, providing an indication that a breach may have occurred.

For example, the different advantageous embodiments recognize that attempts may be made to place unauthorized objects under seat cushions. The use of tamper evident tape may not work with seat cushions and/or fabrics. Tamper evident tape may be dislodged through normal use because seat cushions may be moveable and compressible.

Thus, the different advantageous embodiments provide a method and apparatus for an aircraft seat system in which seat cushion retention and monitoring are provided. In these different advantageous embodiments, a seat frame may have a top side. A seat cushion may also have a bottom side. Electrically conductive first sections of a hook and loop fastener system may be attached to the bottom side of the seat cushion in a first pattern. Electrically conductive second sections of the hook and loop fastener system may be attached to the top side of the frame in a second pattern. A sensor connector may be connected to the second pattern. The first conductive sections and second conductive sections may engage each other and create a closed circuit for the sensor connector when the bottom side of the seat cushion is placed on the top side of the frame.

Figure 3:
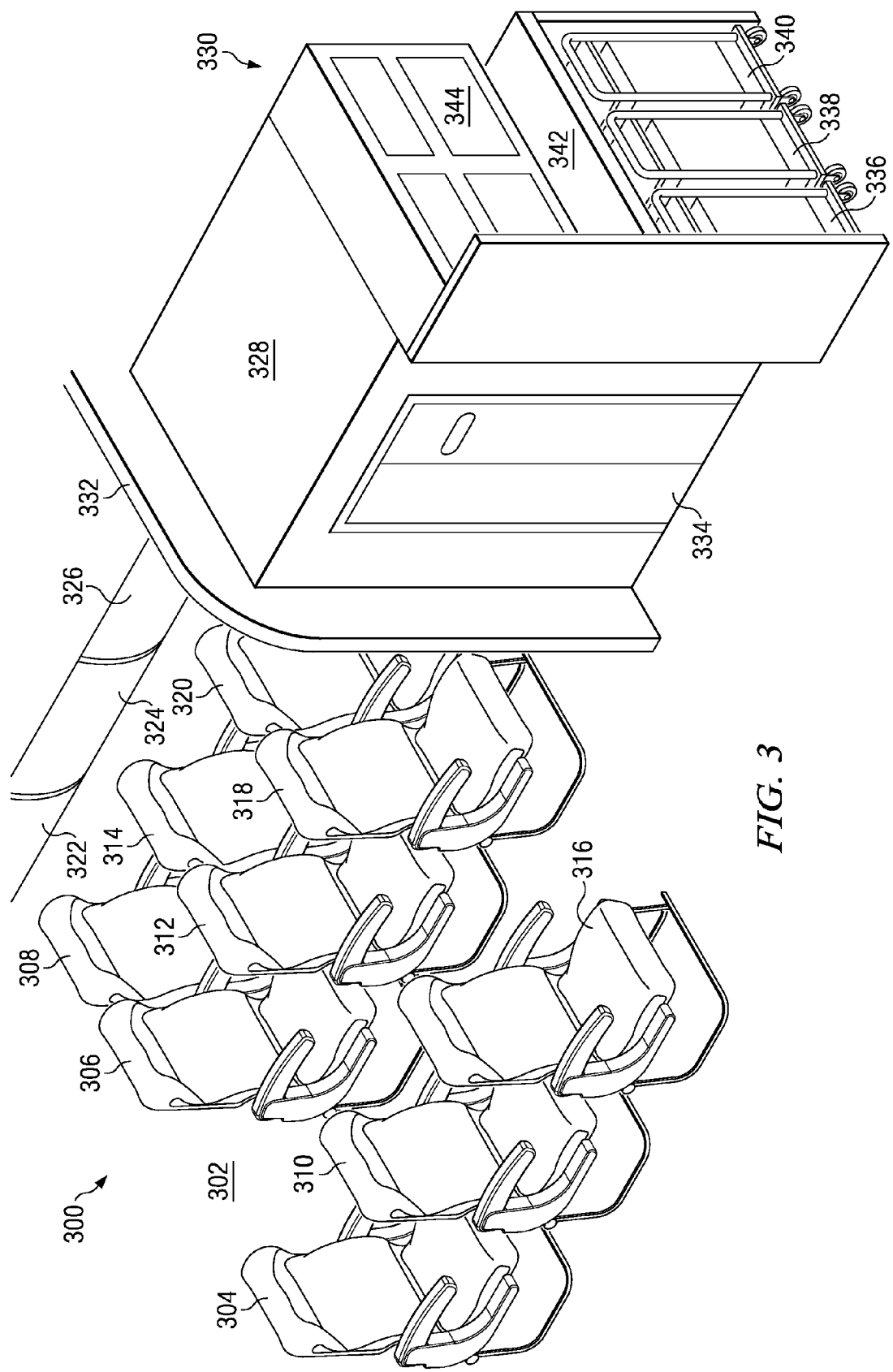
FIG. 3 is an illustration of a passenger cabin in accordance with an advantageous embodiment.

Turning now to FIG. 3, a diagram of a passenger cabin is depicted in accordance with an advantageous embodiment. In this example, passenger cabin 300 is an example of a seating area that may be present in interior 206 of aircraft 200 in FIG. 2. Passenger cabin 300 may include passenger seating in seating area 302. Passenger seating may include aircraft seats 304, 306, 308, 310, 312, 314, 316, 318, and 320.

Further, seating area 302 in passenger cabin 300 may also include storage areas, such as overhead compartments 322, 324, and 326. Passenger cabin 300 also may include lavatory 328 and galley area 330. These two areas may be partitioned or separated from seating area 302 by a partitioning structure such as, for example, without limitation, wall 332. Lavatory 328 may have door 334, which allows entry into lavatory 328. Further, galley area 330 may include carts 336, 338, and 340, which may be stored under counter 342. Further, galley area 330 also may include cabinets 344. Cabinets 344 may store various items, such as, for example, without limitation, drinks, tableware, plates, cups, napkins, coffee, and other suitable items for galley area 330.

This illustration of passenger cabin 300 for an aircraft is provided for purposes of illustrating one environment in which the different advantageous embodiments may be implemented. The illustration of passenger cabin 300 in FIG. 3 is not meant to imply architectural limitations as to the manner in which different advantageous embodiments may be implemented. For example, other area may be present in addition to passenger seating area 302, lavatory 328, and galley area 330.

Other areas may include, for example, without limitation, closets, storage areas, lounges, and other suitable areas for passenger seating. As another example, aircraft seats within seating area 302 may be arranged differently from the depicted example. In other advantageous embodiments, seats may be grouped into sets of three, four, five, or any number of aircraft seats instead of two or single seats as illustrated in seating area 302. The different advantageous embodiments provide emergency equipment systems that may be integrated into aircraft seats, such as those illustrate in FIG. 3.

Figure 4:
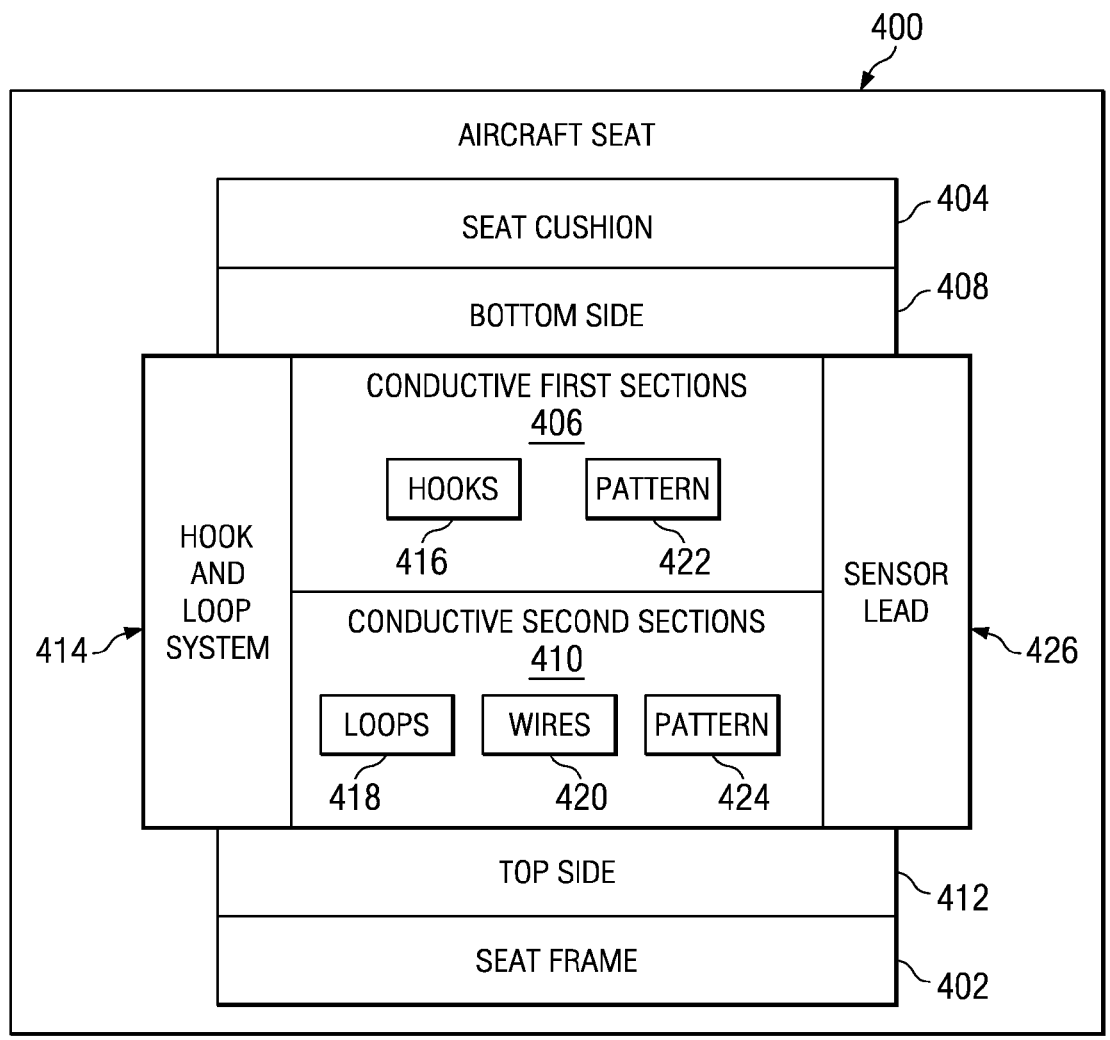
FIG. 4 is an illustrative block diagram of an aircraft seating system in accordance with an advantageous embodiment.

Turning now to FIG. 4, an illustrative block diagram of an aircraft seating system is depicted in accordance with an advantageous embodiment. In this example, aircraft seat 400 may be an example of an aircraft seat, such as aircraft seat 304 in FIG. 3. In this example, aircraft seat 400 may include seat frame 402 and seat cushion 404. Seat frame 402 may provide the structure for aircraft seat 400.

In these examples, seat frame 402 may be formed from a light weight material. For example, without limitation, seat frame 402 may be made of aluminum, composite fiber, titanium, a hybrid of materials, or some other suitable material. Seat cushion 404 may be made from various materials. For example, seat cushion 404 may be made from, for example, without limitation, a fire resistant foam type material encased in fabric, cloth, leather, or some other suitable material.

In these advantageous embodiments, seat cushion 404 may have first electrically conductive sections 406 arranged in a pattern on bottom side 408 of seat cushion 404. Electrically conductive second sections 410 may be attached to top side 412 of seat frame 402. This top side may be, for example, a seat pan designed to receive seat cushion 404.

In the advantageous embodiments, for example, without limitation, conductive first sections 406 and conductive second sections 410 may be part of hook and loop system 414. Conductive first sections 406 may contain hooks 416 while conductive second sections 410 contain loops 418. In these examples, references to conductive items refer to electrically conductive items. For example, conductive first sections 406 and conductive second sections 410 are electrically conductive sections in these examples. A section within conductive first sections 406 may be, for example, without limitation, a strip containing hooks from hooks 416. A section within conductive second sections 410 may be, for example, without limitation, a strip containing loops from loops 418. In these advantageous embodiments, these conductive sections may be conductive because the strips of hooks and the strips of loops in hooks 416 and loops 418 are made from conductive materials.

In other advantageous embodiments, conductive sections may be made and/or formed conductively through the use of wires, such as wires 420. These wires may be arranged such that un-insulated portions of the wires are present to provide conductivity for a conductive section. In some implementations, a non-conductive section may be partitioned into a plurality of conductive sections through the use of wires. A wire may have exposed portions to form a conductive section within a non-conductive section. When multiple wires are arranged in a non-conductive section, a plurality of conductive sections may be made from this single section. In the different advantageous embodiments, these different conductive sections may not be separated from the non-conductive portions. In other words, the conductive sections may be formed through a length and/or area made conductive and/or interconnected by wires.

Depending on the particular implementation, conductive first sections 406 and conductive second sections 410 may be both made of conductive materials. In other advantageous embodiments, both may have wires connected to or arranged in a manner to provide conductivity. In other advantageous embodiments, one side may be made of a conductive material while the other side includes an arrangement of wires to provide conductivity.

The first conductive sections may be arranged in pattern 422 while the second conductive sections are arranged in pattern 424. These patterns may be designed such that when bottom side 408 and seat cushion 404 may be placed on top side 412 of seat frame 402, a closed circuit is made with respect to sensor lead 426.

Although specific examples of conductive first sections 406 and conductive second sections 410 are presented in the different illustrated examples, other types of conductive sections may be used in addition to hooks 416 and loops 418. For example, without limitation, compliant types of conductive foam, conductive fabric, conductive gaskets, or other suitable conductive materials may be used. Additional examples include, for example, without limitation, patches of conductive metalized mylar, conductive tape, and other suitable materials. These materials may be already conductive and/or may include wires or other suitable materials to form conductive sections as described above.

With the use of these types of materials, hook and loop strips may be used to secure bottom side 408 and seat cushion 404 to top side 412 of seat frame 402. With this type of implementation, conductive first sections 406 and conductive second sections 410 may not need to hold seat cushion 404 in place with respect to seat frame 402.

Additionally, materials with electrical type of resistance also may be used. Also, with this type of material, monitoring changes between electrically resistive and open circuit conditions may be detected. In yet another non-limiting example, magnet and magnetic reed switches may be used to form conductive first sections 406 and conductive second sections 410.

Through this configuration, attempts to remove, pull up, pry up a portion of, or otherwise dislodge seat cushion 404 may result in an open circuit that may be detected through sensor lead 426. In these examples, pattern 422 and pattern 424 may overlap each other when seat cushion 404 is placed on seat frame 402.

Figure 5:
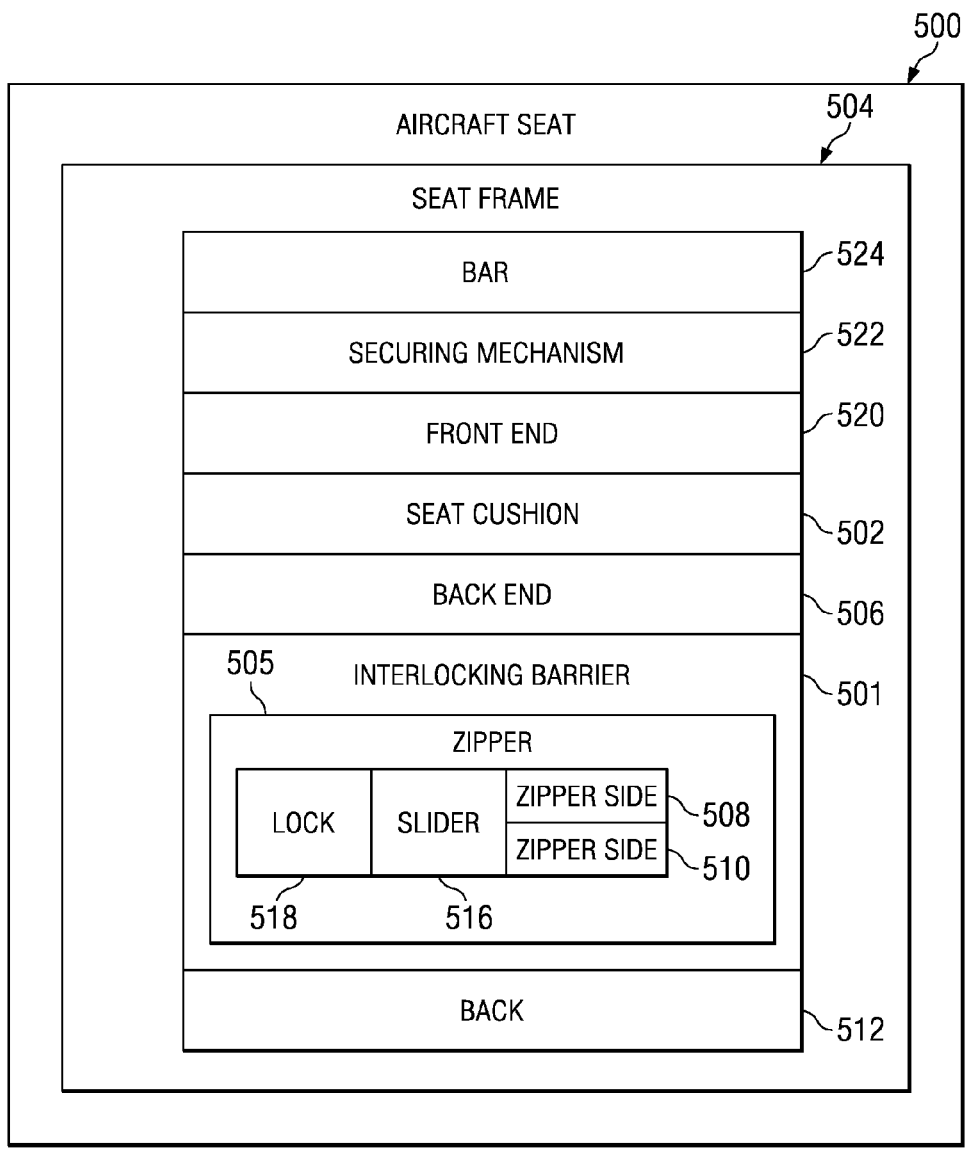
FIG. 5 is a block diagram of an aircraft seat in accordance with an advantageous embodiment.

With reference now to FIG. 5, a block diagram of an aircraft seat is depicted in accordance with an advantageous embodiment. In this example, aircraft seat 500 may include interlocking barrier 501 to secure seat cushion 502 to seat frame 504 in a manner that seat cushion 502 cannot be lifted up and/or compromised. In these examples, interlocking barrier 501 may take the form of zipper 505.

In these examples, back end 506 of seat cushion 502 may have zipper side 508. Zipper side 508 may be one side of a zipper mechanism. Zipper side 510 may be the other portion of the zipper mechanism and is attached to back 512 of seat frame 504. Zipper side 508 and zipper side 510 may form zipper 505. Zipper 505 may contain teeth in zipper side 508 and zipper side 510. These teeth may be, for example, without limitation, a continuous coil in which slider 516 in a Y shaped channel meshes together the uppers and lowers depending on the movement of slider 516.

When zipper side 508 and zipper side 510 are engaged, lock 518 may be secured to slider 516. In this manner, access to any space between back end 506 of seat cushion 502 and back 512 of seat frame 504 may be prevented by zipper 505. Of course, other types of inter-connecting barrier systems may be used in addition to zipper 505. For example, multiple linear fabric loops may be integrated into back end 506 of seat cushion 502. Alternating multiple space linear fabrics may be integrated into back 512 of seat frame 504. These loops may inter-connect to form a channel. A semi rigid slider rod may be placed through these loops and/or locked in place to secure the space between back 512 and cushion 502.

Additionally, front end 520 may be secured to seat frame 504 through securing mechanism 522. Securing mechanism 522 may be attached to a component, such as bar 524 in seat frame 504 to secure seat cushion 502 to seat frame 504. In these examples, bar 524 may be a bar in which seat cushion 502 may be supported. Securing mechanism 522 may take various forms, such as, for example, without limitation, a set of clips that clip to bar 524, an elongate hollow member through which a cable may pass through the hollow elongate member and bar 524, and/or some other suitable mechanism.

Figure 6:
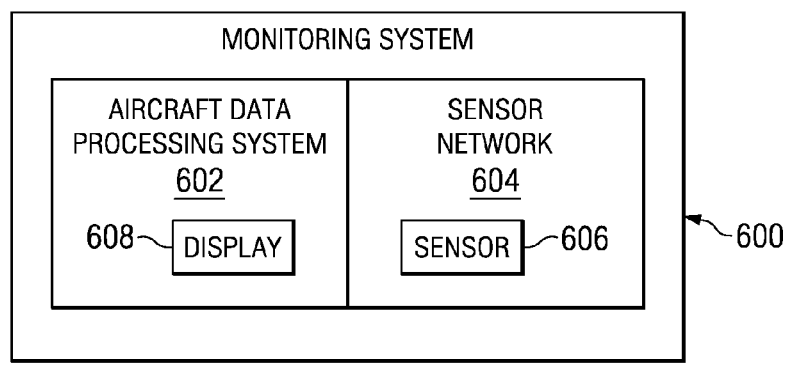
FIG. 6 is a block diagram of a monitoring system in accordance with an advantageous embodiment.

With reference now to FIG. 6, a block diagram of a monitoring system is depicted in accordance with an advantageous embodiment. In this example, monitoring system 600 may be an example of a monitoring system that may be found in an aircraft, such as aircraft 200 in FIG. 2. Monitoring system 600 is an example of monitoring system 216 within systems 204 in FIG. 2.

Monitoring system 600 in these examples may include aircraft data processing system 602 and sensor network 604. Aircraft data processing system 602 may be, for example, a computer, a line replaceable unit, or some other suitable component. Aircraft data processing system 602 monitors sensor network 604 for signals or messages that may indicate a presence of unauthorized access to an area in the aircraft.

Sensor network 604 may contain different types of sensors to monitor various states within the aircraft. Sensor network 604 may include, for example, without limitation, a temperature sensor, a biometric unit, an air flow detector, a switch, and/or some other suitable sensor device. Sensor 606 may be part of sensor network 604.

In these examples, sensor network 604 may detect a state of sensor 606. Sensor 606 in this advantageous embodiment may include conductive first sections 406 and conductive second sections 410 arranged in patterns 422 and 424 in FIG. 4 respectively. In these examples, sensor 606 may transmit signals across sensor network 604. Aircraft data processing system 602 may include display 608 to indicate when an intrusion may have occurred.

Figure 7:
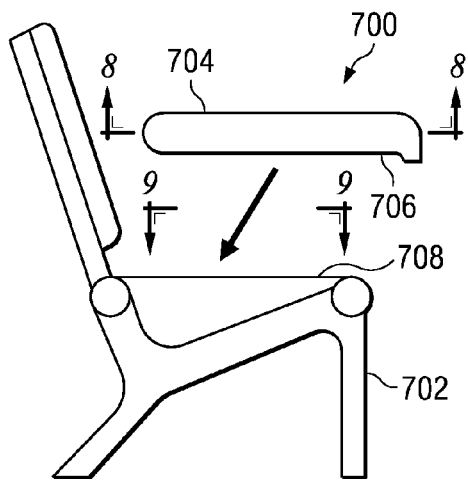
FIG. 7 is an illustration of an aircraft seat in accordance with an advantageous embodiment.

Turning now to FIG. 7, an illustration of an aircraft seat is depicted in accordance with an advantageous embodiment. In this example, aircraft seat 700 may be one example of an implementation of aircraft seat 400 in FIG. 4. In this example, aircraft seat 700 may include seat frame 702 and seat cushion 704.

As can be seen, seat cushion 704 may have bottom side 706, which may be placed onto top side 708 of seat frame 702. Top side 708 in this example may take the form of a seat pan. Seat cushion 704 may have a pattern of conductive first sections, while top side 708 may contain a pattern of conductive second sections. As a result, placement of seat cushion 704 on top side 708 may form a closed circuit. In these examples, seat cushion 704 and seat frame 702 may form a sensor, such as sensor 606 in FIG. 6.

Figure 8:
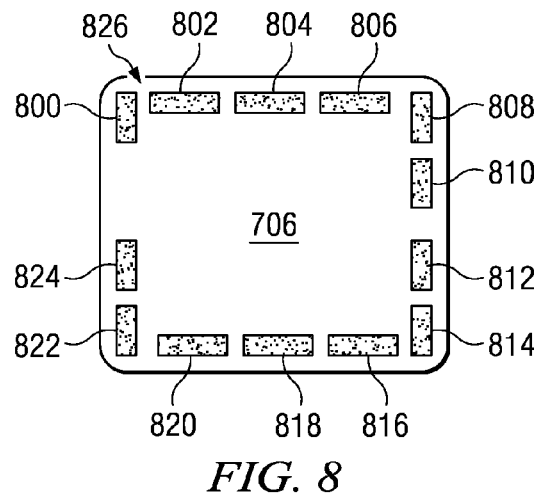
FIG. 8 is an illustration of a bottom side of a seat cushion in accordance with an advantageous embodiment.

Turning now to FIG. 8, an illustration of a bottom side of the seat cushion is depicted in accordance with an advantageous embodiment. In this example, conductive loops 800, 802, 804, 806, 808, 810, 812, 814, 816, 818, 820, 822, and 824 may be attached to bottom side 706 in pattern 826. In this example, pattern 826 may be a rectangular shape in which the conductive loop strips may be arranged around periphery 820 on bottom side 706.

Figure 9:
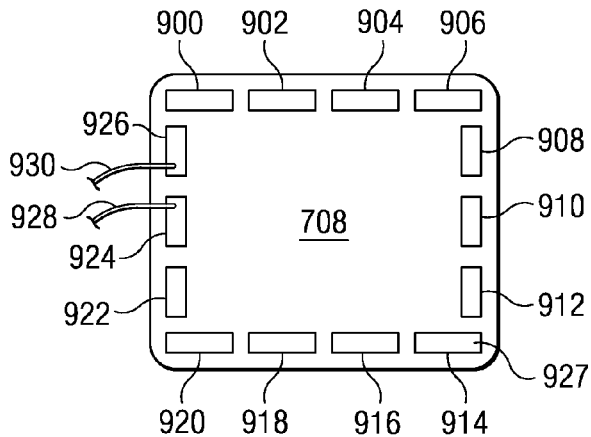
FIG. 9 is an illustration of the top side of a seat frame in accordance with an advantageous embodiment.

With reference now to FIG. 9, an illustration of the top side of a seat frame is depicted in accordance with an advantageous embodiment. In this example, conductive hook sections 900, 902, 904, 906, 908, 910, 912, 914, 916, 918, 920, 922, 924, and 926 may be attached to top side 708 of seat frame 702. These sections are arranged in pattern 927 in these examples. Conductive hook section 924 may be attached to wire 928, and conductive hook section 926 may be attached to wire 930. These wires may lead to other portions of the sensor network used to detect whether an open circuit or closed circuit state is present.

Figure 10:
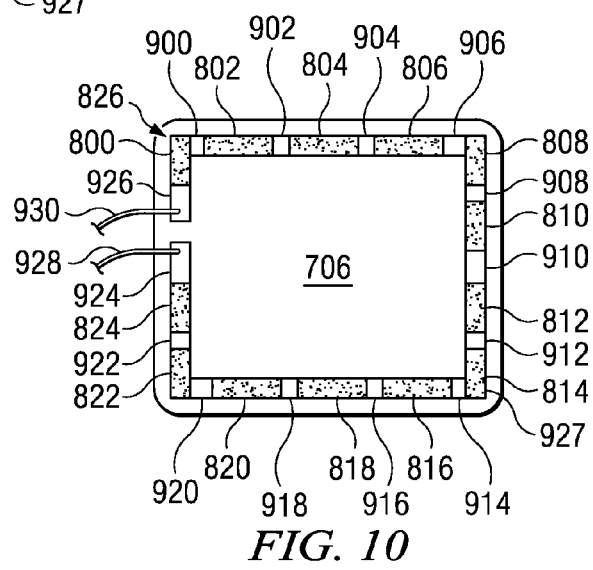
FIG. 10 is an illustration of an overlap in patterns in accordance with an advantageous embodiment.

With reference now to FIG. 10, a diagram illustrating an overlap in patterns 826 and 927 is depicted in accordance with an advantageous embodiment. In this example, patterns 826 and 927 formed by the conductive loop strips and the conductive hook strips may overlap as illustrated in FIG. 10 when seat cushion 704 is placed onto top side 708. In this example, a view of top side 708 is shown with conductive loops 800, 802, 804, 806, 808, 810, 812, 814, 816, 818, 820, 822, and 824 overlapped by conductive hooks 900, 902, 904, 906, 908, 910, 912, 914, 916, 918, 920, 922, 924, and 926.

Figure 11:
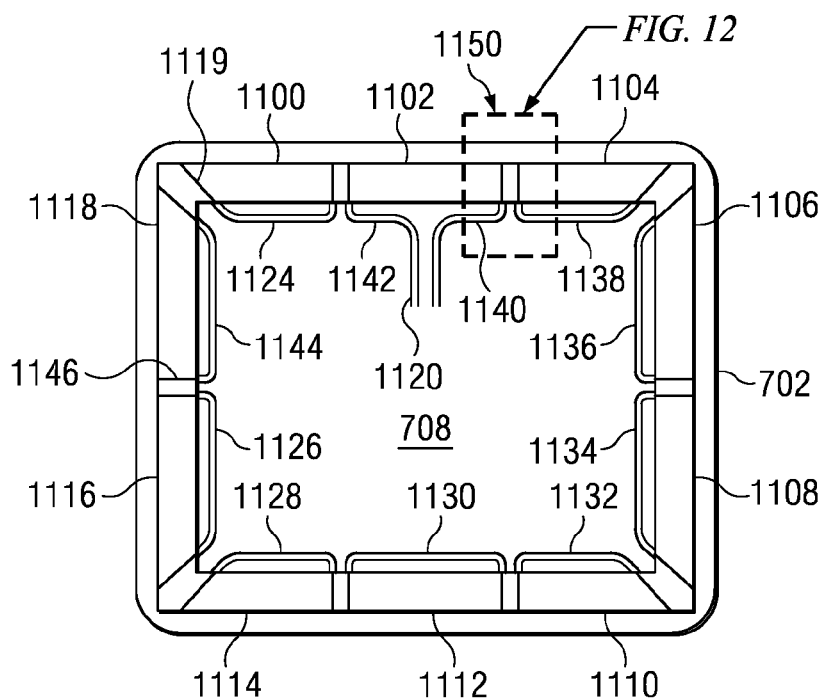
FIG. 11 is an illustration of a top side of a seat frame with conductive sections formed within a hook strip in accordance with an advantageous embodiment.

With reference next to FIG. 11, an illustration of a top side of a seat frame with conductive sections formed within a hook strip is depicted in accordance with an advantageous embodiment. This figure may provide an alternative embodiment for a conductive hook and loop system.

In this illustration, conductive hook sections 1100, 1102, 1104, 1106, 1108, 1110, 1112, 1114, 1116, and 1118 may be formed from non-conductive hook strip 1119. These conductive hook sections may be formed in a pattern on top side 708 of seat frame 702. In this example, this pattern may overlap the pattern illustrated in FIG. 8 to form a closed circuit with respect to sensor leads 1120. These conductive hook sections may be located around periphery 820 of top side 708.

The hook strip 1119 may be made conductive in different sections through the use of wires 1124, 1126, 1128, 1130, 1132, 1134, 1136, 1138, 1140, 1142, and 1144. These wires may have exposed portions, which may provide conductivity to the different sections within hook strip 1119. These wires may be arranged around the periphery of a seat pan in a series, in these examples. These wires may be, for example, without limitation, bonded, stapled, woven, sewn, or secured in place with some other suitable process or mechanism. In other words, the conductive sections may be formed through a length and/or area made conductive or interconnected by wires.

Figure 12:
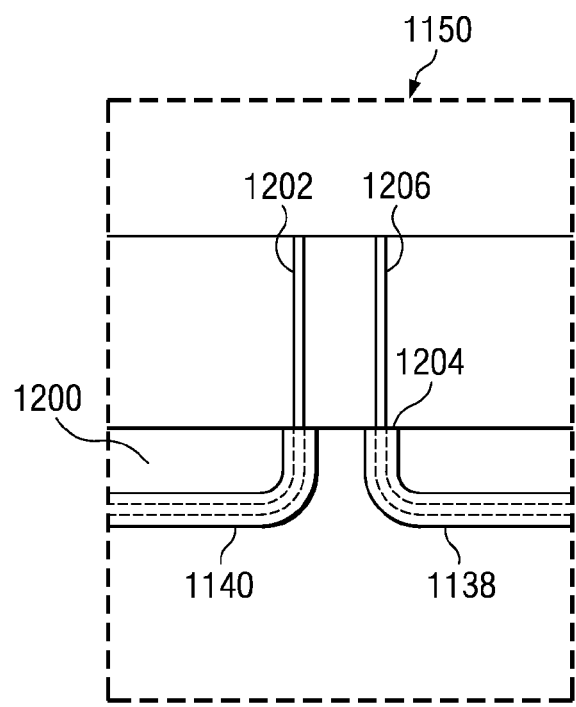
FIG. 12 is an illustration of an arrangement of wires in a conductive hook strip in accordance with an advantageous embodiment.

Turning now to FIG. 12, an illustration of an arrangement of wires in a conductive hook strip is depicted in accordance with an advantageous embodiment. In this example, a portion of conductive hook sections 1102 and 1104 may be shown in more detail from section 1150 in FIG. 11. As can be seen in this example, wire 1138 and wire 1140 may be secured within hook strip 1119. Wire 1140 may be insulated portion 1200 and exposed portion 1202. Wire 1138 may have insulated portion 1204 and exposed portion 1206.

With reference now to FIG. 13, an illustration of a side view of a portion of an aircraft seat is depicted in accordance with an advantageous embodiment. In this example, aircraft seat 1300 may be seen in a side view with seat cushion 1302 secured to seat frame 1304. As depicted, seat frame 1304 may include seat pan 1306, bar 1308, and bar 1310. In this example, zipper 1312 may connect seat cushion 1302 to seat back 1314. Space 1316 may not be accessible and may not be used to hide items.

In addition, zipper 1318 may secure seat cushion 1302 to seat pan 1306. Zipper 1318 may have one side connected to cushion 1302 and another side connected to seat pan 1306. Also, zipper 1312 and zipper 1318 may be secured with a cable tie or some other suitable locking mechanism (not shown). The locking mechanism may prevent removal or disassembly of zipper 1318 and zipper 1312 without an appropriate key or tool.

In addition, in these examples loop and hook systems 1320 and 1322 may be used to further secure seat cushion 1302 to seat pan 1306. Also, loop and hook systems 1320 and 1322 may be conductive systems using patterns to form a switch in the manner discussed above.

With reference now to FIG. 14, a more detailed illustration of a portion of an aircraft seat is depicted in accordance with an advantageous embodiment. In this example, a more detailed illustration of section 1324 is shown in FIG. 14.

With reference now to FIG. 15, a top view of aircraft seat 1300 is depicted in accordance with an advantageous embodiment. As can be seen in this top view, zipper 1312 may prevent access to the space between seat cushion 1302 and seat back 1314. Further, zipper 1318 may prevent seat cushion 1302 from being pulled upwards from seat frame 1304.

With reference now to FIG. 16, an illustration of three seats using zipper barriers is depicted in accordance with an advantageous embodiment. In this example, seats 1600, 1602, and 1604 may be arranged in a row. As can be seen in these examples, seat 1600 may include zipper 1606 and zipper 1608. Seat 1602 may include zippers 1610 and 1612, and seat 1604 may include zippers 1614 and 1616. These zippers may be used to secure seats 1600, 1602, and 1604. These types of zipper systems also may provide a barrier that may prevent placement of objects into spaces that may be hidden from view.

With reference now to FIG. 17, an illustration of a side view of an aircraft seat is depicted in accordance with an advantageous embodiment. In this example, aircraft seat 1700 may include seat cushion 1702, which may be secured to frame 1704. As illustrated, frame 1704 may include bar 1706 and bar 1708. Additionally, frame 1704 also may include seat pan 1710 and seat back 1712.

In this example, zipper 1714 may be used to secure seat cushion 1702 to seat back 1712. In this embodiment, front end 1716 may be secured to frame 1704 via bar 1706 using clip 1718. In particular, clip 1718 may be secured to seat cushion 1702 and bar 1706.

Figure 18:
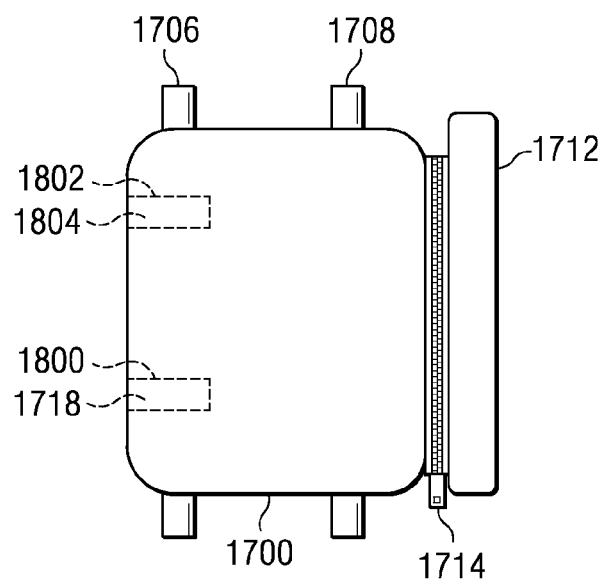
FIG. 18 is a top view of a seat in accordance with an advantageous embodiment.

Turning now to FIG. 18, a top view of seat 1700 is depicted in accordance with an advantageous embodiment. In this example, clip 1718 may be identified by dotted line 1800. Another clip, clip 1802, may be identified by dotted line 1804.

Figure 19:
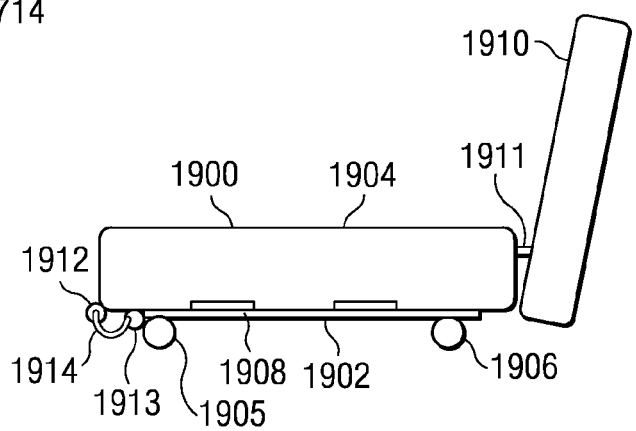
FIG. 19 is an illustration of an aircraft seat in accordance with an advantageous embodiment.

Turning now to FIG. 19, an illustration of an aircraft seat is depicted in accordance with an advantageous embodiment. In this example, aircraft seat 1900 may include frame 1902 on which seat cushion 1904 rests. In this example, frame 1902 may include bar 1905, bar 1906, and seat pan 1908. Seat cushion 1904 may be secured to seat back 1910 by zipper 1911. Seat cushion 1904 may also be secured to frame 1900.

Loop 1912 may be an elongate piece of material with a channel and may be attached to seat cushion 1904. This material may be, for example, without limitation, rigid or flexible. One or more loops, such as loops 1912, may be attached to seat cushion 1904 in these examples. Loop 1912, which may be secured to loop 1913, which may be attached and/or secured to seat pan 1908 using cable 1914. Cable 1914 may be passed or attached to loop 1913 and passed through tube 1912 to secure seat cushion 1904 to frame 1902.

Figure 20:
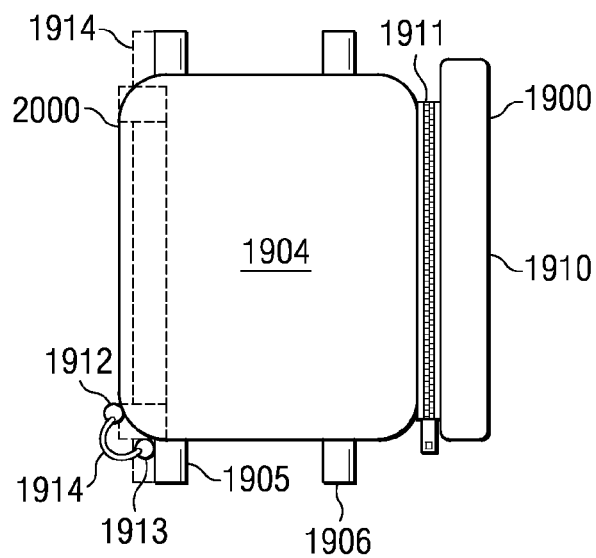
FIG. 20 is a top view of an aircraft seat in accordance with an advantageous embodiment.

With reference now to FIG. 20, a top view of aircraft seat 1900 is depicted in accordance with an advantageous embodiment. In this example, cable 1914 can be better viewed with respect to bar 1905 and tube 1906 and tube 2000.

Figure 21:
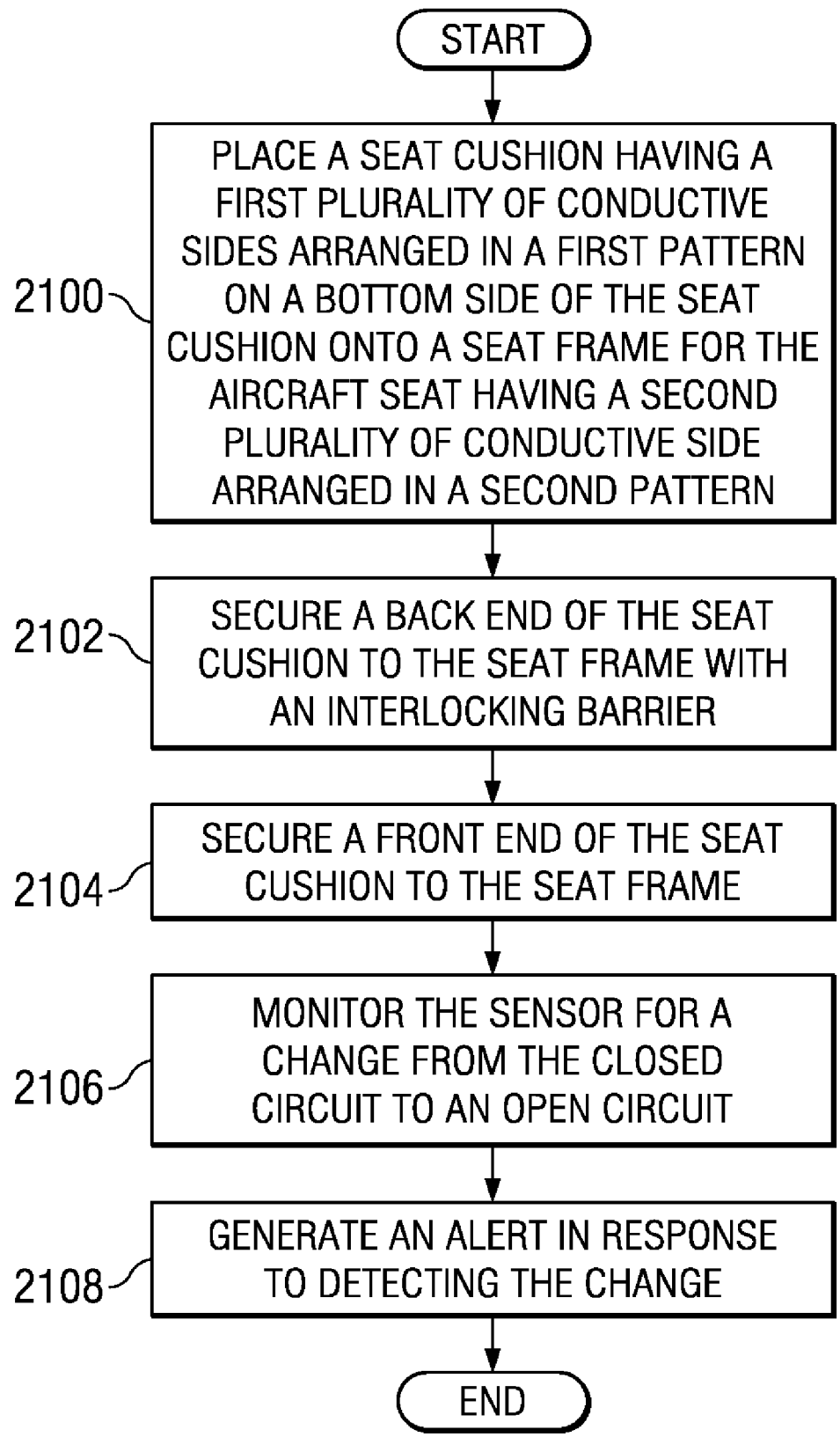
FIG. 21 is a flowchart of a process for monitoring a seat cushion for an aircraft seat in accordance with an advantageous embodiment.

With reference to FIG. 21, a flowchart of a process for monitoring a seat cushion for an aircraft seat is depicted in accordance with an advantageous embodiment. The process illustrated in FIG. 21 may be implemented using a monitoring system, such as monitoring system 600 in FIG. 6.

The process begins by placing a seat cushion having a first plurality of conductive sides arranged in a first pattern on a bottom side of the seat cushion onto a seat frame for the aircraft seat having a second plurality of conductive side arranged in a second pattern (operation 2100). The contact between the first pattern and the second pattern form a closed circuit for a sensor.

The process also may secure a back end of the seat cushion to the seat frame with an interlocking barrier (operation 2102) and secure a front end of the seat cushion to the seat frame (operation 2104). These two operations may be used to secure the seat cushion and prevent insertion of objects into spaces where they may be hidden from plain view.

The process then monitors the sensor for a change from the closed circuit to an open circuit (operation 2106). Responsive to detecting the change, the process generates an alert (operation 2108). The process terminates thereafter. The alert indicates that the seat cushion has been disturbed.

In this manner, the different advantageous embodiments provide mechanisms to detect tampering of seat cushions. The different advantageous embodiments also may provide mechanisms to prevent tampering and/or placement of objects in areas that may be hidden from sight. Any combination of these different mechanisms may be used to provide increased retention and monitoring within an aircraft cabin. Further, with an ability to monitor for tampering in seat cushions, and an ability to prevent objects from being placed in spaces that may be hidden from sight, the amount of time needed for inspections of an aircraft cabin may be reduced.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples like modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A seating system comprising:
   a seat frame having a top side;
   a seat cushion having a bottom side;
   a plurality of conductive first sides attached to the bottom side of the seat cushion in a first pattern, the first pattern substantially arranged around a periphery of the bottom side;
   a plurality of conductive second sides attached to the top side of the seat frame in a second pattern, the second pattern substantially arranged around a periphery of the top side; and
   a sensor connector connected to the second pattern, wherein the plurality of conductive first sides and the plurality of conductive second sides engage each other and create a closed circuit for the sensor connector when the bottom side of the seat cushion is placed on the top side of the seat frame.

2. The seating system of claim 1, wherein the plurality of conductive second sides includes a plurality of wires having exposed sections at ends connected to the plurality of second sides in a manner to create the closed circuit with the plurality of conductive first sides when the bottom side of the seat cushion is placed on the top side of the seat frame.

3. The seating system of claim 1, wherein the plurality of conductive first sides is a plurality of conductive strips with loops and wherein the plurality of conductive second sides is a plurality of conductive strips with hooks.

4. The seating system of claim 1, wherein the plurality of conductive first sides is a plurality of strips with hooks and wherein the plurality of conductive second sides is a plurality of strips with loops.

5. The seating system of claim 1, wherein the frame includes a seat pan on the top side.

6. The seating system of claim 1, wherein the sensor connector is in communication with a monitoring system.

7. The seating system of claim 1 further comprising:
   a first side of a zipper attached to a back end of the seat cushion;
   a second side of the zipper attached to a back of the seat frame;
   a securing mechanism attached to a front end of the seat cushion; and
   a locking mechanism capable of locking the first side and the second side of the zipper in a joined configuration.

8. The seating system of claim 1, wherein the seat frame includes a front elongate member and further comprising
   a set of clips attached to a front end of the seat cushion such that set of clips is capable of being engaged with the front elongate member when the first side and the second side are in a joined configuration to prevent the seat cushion from being removed from the seat frame.

9. A seating system comprising:
   a seat frame having a back;
   a seat cushion;
   a first side of a zipper attached to a back end of the seat cushion;

a second side of the zipper attached to the back of the seat frame;
a securing mechanism attached to a front end of the seat cushion;
a locking mechanism capable of locking the first side and the second side of the zipper in a joined configuration;
a plurality of conductive first sides of a hook-and-loop fastener system attached to a bottom side of the seat cushion in a first pattern, the first pattern substantially arranged around a periphery of the bottom side;
a plurality of conductive second sides of the hook-and-loop fastener system attached to a top side of the seat frame in a second pattern, the second pattern substantially arranged around a periphery of the top side; and
a sensor connector connected to the second pattern, wherein the plurality of conductive first sides and the plurality of conductive second sides engage each other and create a closed circuit for the sensor connector when the bottom side of the seat cushion is placed on the top side of the seat frame.

10. The seating system of claim 9, wherein the seat frame includes a front elongate member substantially parallel and wherein the securing mechanism comprises:
a set of clips attached to the front end of the seat cushion such that set of clips is capable of being engaged with the front elongate member when the first side and the second side are in the joined configuration to prevent the seat cushion from being removed from the seat frame.

11. The seating system of claim 9, when the first side and the second side are in the joined configuration, a barrier is present against allowing objects to be placed between the back end of the seat cushion and the back of the seat frame.

12. The seating system of claim 9, wherein the seat frame includes a first hollow front elongate member and wherein the securing mechanism comprises:
a second hollow elongate member substantially parallel to the first hollow front elongate member and attached to a front end of the seat cushion;
a cable capable of being placed through a first channel in the first hollow front elongate member and a second channel in the second hollow elongate member; and
a lock capable of securing the cable in place in the first channel in the first hollow front elongate member and the second channel in the second hollow elongate member and capable of preventing the seat cushion from being removed when the first side and the second side are in the joined configuration.

13. The seating system of claim 9, wherein the locking mechanism is selected from one of a cable tie and a lock.

14. The seating system of claim 9, wherein the zipper is a first zipper and further comprising:
one side of a second zipper attached to a first side of the seat cushion; and
one side of a third zipper attached to a second side of the seat cushion, wherein the one side of the second zipper and the one side of the third zipper are capable of being secured to other sides of other zippers attached to sides of other seat cushions.

15. The seating system of claim 9 further comprising:
a set of first sides of a hook-and-loop fastener system attached to a bottom of the seat cushion; and
a set of second sides of the hook-and-loop fastener system attached to a top of a seat pan for the seat frame.

16. The seating system of claim 9, wherein a conductive feature in the plurality of conductive second sides is a plurality of wires having exposed sections at the ends connected to the plurality of second sides in a manner to create the closed circuit with the plurality of conductive first sides when the bottom side of the seat cushion is placed on the top side of the seat frame.

17. The seating system of claim 9, wherein the sensor connector is in communication with a monitoring system.

18. An aircraft seating system for detecting unauthorized movement of seat cushions in an aircraft, the aircraft seating system comprising:
a seat frame having a top side;
a seat cushion having a bottom side;
a plurality of conductive first sides of a hook and loop fastener system attached to the bottom side of the seat cushion in a first pattern, the first pattern comprising a substantially rectangular shape arranged around a periphery of the bottom side, wherein the first plurality of conductive sides is a plurality of strips with hooks;
a plurality of conductive second sides of a hook and loop fastener system attached to a seat pan on the top side of the seat frame in a second pattern, the second pattern comprising a substantially rectangular shape arranged around a periphery of the top side, wherein the second plurality of conductive sides is a plurality of strips with loops;
a first side of a zipper attached to a back end of the seat cushion;
a second side of the zipper attached to the back of the seat frame;
a securing mechanism attached to a front end of the seat cushion; and
a locking mechanism capable of locking the first side and the second side of the zipper in a joined configuration; and
a sensor connector connected to the second pattern, wherein the plurality of conductive first sides and the plurality of conductive second sides engage each other and create a closed circuit for the sensor connector when the bottom side of the seat cushion is placed on the top side of the seat frame, wherein movement sufficient to disturb the closed circuit generates an indication that an unauthorized movement of the seat cushion has occurred.

19. A method for monitoring a seat cushion for an aircraft seat, the method comprising:
placing a seat cushion having a first plurality of conductive sides arranged in a first pattern on a bottom side of the seat cushion onto a seat frame for the aircraft seat having a second plurality of conductive side arranged in a second pattern to form a closed circuit for a sensor, the first pattern substantially arranged around a periphery of the bottom side, and the second pattern substantially arranged around a periphery of a top side;
monitoring the sensor for a change from the closed circuit to an open circuit; and
responsive to detecting the change, generating an alert.

20. The method of claim 19, wherein the alert indicates that the seat cushion has been disturbed.

21. The method of claim 19 further comprising:
securing a back end of the seat cushion to the seat frame with a barrier cover; and
securing a front end of the seat cushion to the seat frame.

* * * * *

UNITED STATES PATENT AND TRADEMARK OFFICE
CERTIFICATE OF CORRECTION

PATENT NO. : 8,094,041 B2  
APPLICATION NO. : 12/059209  
DATED : January 10, 2012  
INVENTOR(S) : Mark E. Wentland et al.

Page 1 of 1

It is certified that error appears in the above-identified patent and that said Letters Patent is hereby corrected as shown below:

Title Page in (75) Inventors:

Please remove "Sohalla" and insert --Schalla--

Signed and Sealed this  
Tenth Day of April, 2012

David J. Kappos  
*Director of the United States Patent and Trademark Office*